United States Patent [19]

Haley

[11] 4,438,475

[45] Mar. 20, 1984

[54] ULTRA-HIGH SPEED PROTECTIVE RELAY APPARATUS AND METHOD FOR PROVIDING SINGLE POLE SWITCHING

[75] Inventor: Paul H. Haley, Monroeville, Pa.

[73] Assignee: Westinghouse Electric Corp., Pittsburgh, Pa.

[21] Appl. No.: 404,170

[22] Filed: Aug. 2, 1982

[51] Int. Cl.³ .................. H02H 3/26; G01R 31/08
[52] U.S. Cl. ......................... 361/82; 361/84; 324/52
[58] Field of Search .............. 361/65, 66, 80, 81, 361/82, 83, 84; 324/52

[56] References Cited

U.S. PATENT DOCUMENTS

| | | | |
|---|---|---|---|
| 4,329,727 | 5/1982 | Premerlani | 361/80 |
| 4,352,137 | 9/1982 | Johns | 324/52 |
| 4,371,907 | 2/1983 | Bignell | 361/82 |

Primary Examiner—E. A. Goldberg
Assistant Examiner—Patrick W. Foster
Attorney, Agent, or Firm—J. L. DeAngelis, Jr.

[57] ABSTRACT

Protective relay apparatus and method for determining the faulted phase conductor of a three-phase ac electrical transmission line. The voltage and current on each conductor are measured and the steady-state ac electric power signal removed. The resulting filtered-voltage signals are multiplied by the characteristic admittance of the transmission line and then combined with the filtered-current signals to produce three current signals representative of the current on each conductor caused by an incident traveling wave and three current signals representative of the current on each conductor caused by a forward traveling wave. A comparator compares the six current signals to provide an indication of the direction to the fault and to provide an enable signal when the fault is on the protected line segment. The three incident-wave current signals are filtered to provide a modal signal representing the total current produced on the transmission line by a first propagational mode of the incident traveling wave. A discriminator processes the three incident-wave signals, the modal signal, and the enable signal to provide an indication of the faulted phase conductor.

48 Claims, 7 Drawing Figures

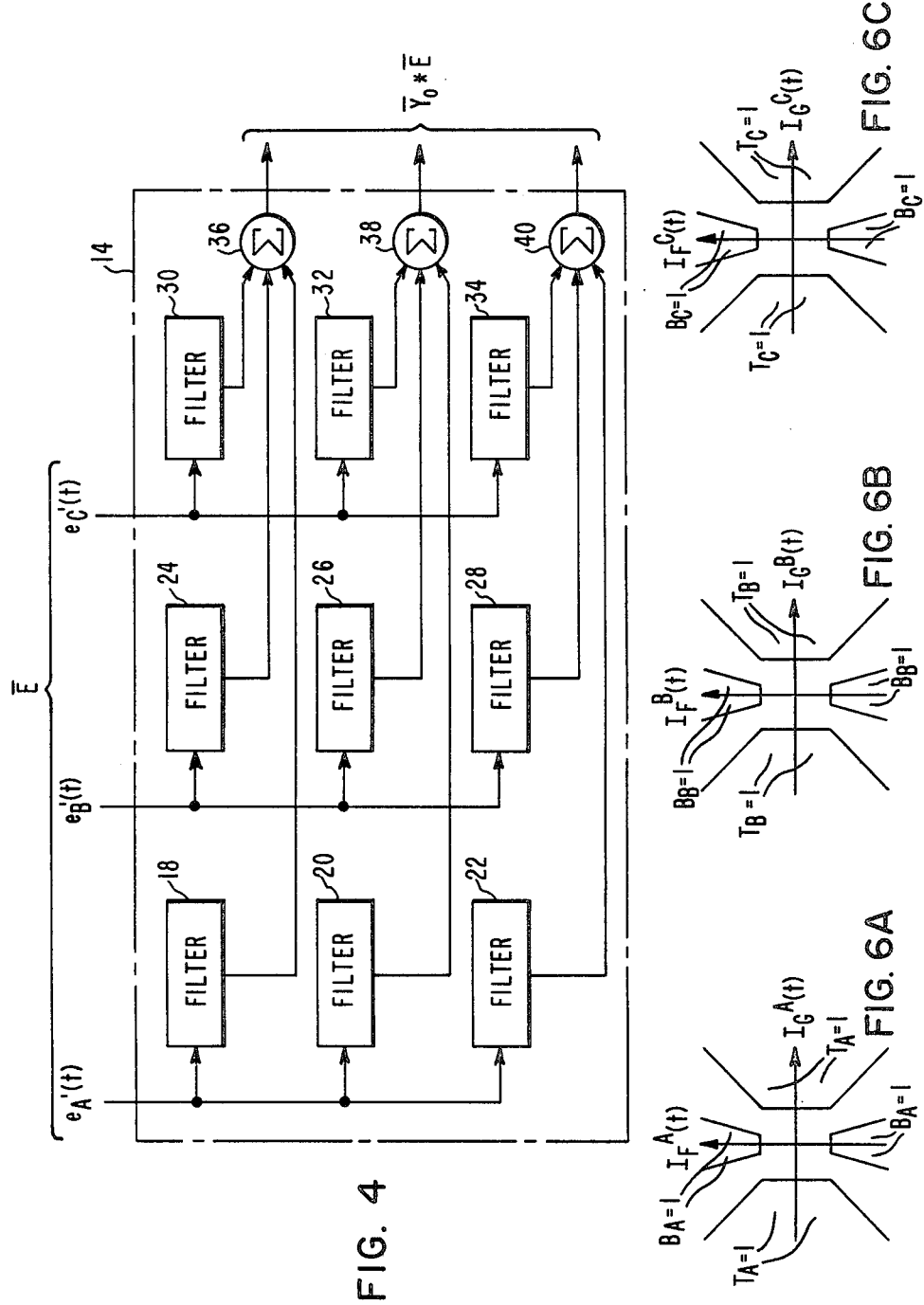

ULTRA-HIGH SPEED PROTECTIVE RELAY APPARATUS AND METHOD FOR PROVIDING SINGLE POLE SWITCHING

BACKGROUND OF THE INVENTION

1. Field of the Invention

This invention relates generally to protective relay apparatus and methods for protecting ac electrical power transmission lines, and more specifically, to high speed protective relay apparatus and methods utilizing traveling waves to detect a fault on the transmission line.

2. Description of the Prior Art

Three-phase electrical transmission lines and power generating equipment must be protected against insulation faults and consequent short circuits or drops in shunt resistance which could cause collapse of the power system, serious and expensive apparatus damage, and personal injury. For instance, such a fault condition is caused by lightning-induced flashover from a transmission line to ground or between adjacent transmission line conductors. Under such a faulted condition, line currents can increase to several times the normal value thereby causing loss of synchronism among generators and damaging or destroying both the transmission line and the attached equipment. To avoid equipment damage and collapse of the entire power system, faulted apparatus on the main transmission line must be isolated from the network in 0.1 to 0.5 seconds. The isolation time limit must allow for the operation of large circuit breakers interrupting up to 80,000 amperes and the completion of backup operations if these primary protective devices fail to function properly. To allow sufficient time for circuit interruption, location of the fault must be determined in approximately 8 ms to 20 ms. It is the function of the protective relays, which continuously monitor ac voltages and currents, to locate line faults and initiate isolation via tripping of the appropriate circuit breakers.

The direction to a fault with reference to a measuring location on a transmission line is usually determined with the aid of distance relays. These relays usually incorporate electromechanical or electronic elements which require substantially sinusoidal power-frequency input signals to function correctly. When a fault occurs on the transmission line, the power-frequency signals are distorted by the transient traveling waves generated by the fault. Since the distorted power-frequency signals are not suitable for detection by a distance relay, operation of the protective relay must await decay of the distortion effects, i.e., the traveling waves. This decay is a comparatively slow process. Alternatively, frequency filters may be used to filter the effects of the transient traveling waves thereby enabling the power-frequency components to be evaluated by the protective relay at an earlier time. However, the filtering action also limits the response time of the protective relay.

Since increasing the speed of fault detection and the consequent fault clearing improves system stability, it has been proposed that the initial changes in transmission line voltage and current caused by the traveling waves generated by a fault be utilized to detect and clear faults. The resulting clearing time is faster than possible using the power-frequency signals. Additionally, to clear a fault with minimum disturbance to the generation and transmission system requires the protective relay to determine both the direction to the fault and the specific phase conductor on which the fault is located.

Two protective relays, located at opposite bus terminals of a transmission line, with the intervening transmission line define a protected line segment. When the charged transmission line is faulted to ground at a point between the protective relays an incident traveling wave of voltage and current is launched from the fault in both directions toward the protective relays. For clarity in the subsequent discussion, it is to be assumed that a step voltage change, as caused by a fault to ground, produces a positive current into the protected line segment. It is well known in the art that the voltage and current of such an incident traveling wave have opposite signs and are related by the equation $\Delta I = -Y_0 \times \Delta E$, where $\Delta I$ is the change in current from the steady-state current, $\Delta E$ is the change in voltage from the steady-state voltage, and $Y_0$ is the characteristic admittance of the transmission line. If the current and voltage at both protective relays have opposite signs, this indicates the fault is on the protected line segment and both protective relays trip the appropriate circuit breakers.

For external faults, i.e., outside the protected line segment, the current and voltage at the protective relay nearest to the fault have the same sign, while at the furthest protective relay they have opposite signs. At the nearest protective relay the current and voltage are related by the equation $\Delta I = Y_0 \times \Delta E$, where $\Delta I$ is the change in current from the steady-state current, $\Delta E$ is the change in voltage from the steady-state voltage, and $Y_0$ is the characteristic admittance of the transmission line. Under these conditions the protective relay nearest the fault transmits a block signal to the other protective relay. The block signal prevents the latter from tripping although the current and voltage at this protective relay are opposite in sign.

One prior art technique for implementing the above fault detection scheme is disclosed in U.S. Pat. Nos. 3,878,460; 3,956,671 and 4,296,452. After filtering the current and voltage transient waves to remove the steady-state ac power frequency signal, level detectors and sign indicators are used to determine the sign relationship of the current and voltage traveling waves and produce the tripping and blocking signals if the current and voltage traveling waves exceed a predetermined threshold.

U.S. Pat. No. 4,287,547 (and a related article "A Fundamental Concept for High-Speed Relaying;" by M. Vitins; *IEEE Transactions on Power Apparatus and Systems;* Vol. PAS-100, No. 1; January 1981; pp. 163–168) discloses a more sophisticated apparatus for detecting a fault from current and voltage traveling waves. Using the current and voltage surge signals, representing the change in current and voltage from the steady-state condition, as X and Y coordinates respectively, a trajectory is plotted in the X-Y plane. The trajectory represents the change in the current and voltage transient signals over time. Threshold boundaries are also established in the X-Y plane, and depending on the boundary crossed, a fault detection determination can be made and appropriate tripping and blocking signals produced. The threshold boundaries are either predetermined or functionally related to the current and voltage surge signals for more accurate fault detection.

U.S. Pat. No. 4,371,907 assigned to the assignee of the instant invention also discloses a trajectory-plotting means to determine the location of a fault. However, in this patent the current deviation signal is differentiated before plotting on the X-Y plane. As a result, for typical bus terminations the eliptical trajectory that is formed in the previously discussed patents is transformed to a straight line thereby providing more accurate detection of the fault's location.

Other prior art U.S. patents exemplifying fault detection using traveling waves include, U.S. Pat. Nos.: 3,590,368; 4,063,160; 4,063,162; 4,063,163; 4,063,164; 4,063,165; 4,063,166; and 4,183,072. U.S. Pat. Nos. 4,063,160; 4,063,162; 4,063,166; 4,063,165 and 4,963,166 produce two signals representative of the forward and incident waves at a test location. From a determination of the time displacement between these oppositely moving traveling waves the direction and distance to a fault can be determined. U.S. Pat. No. 4,063,164 teaches monitoring the respective phase positions of two oppositely moving traveling waves to detect short circuits on the transmission line.

U.S. Pat. No. 4,183,072 teaches yet another protective relay and apparatus for detecting a fault on a transmission line. Essentially, for a single wire transmission line the apparatus compares the current and voltage of the traveling wave as it passes through one of the line terminals with a current and voltage of the same traveling wave as it passes through the other line terminal, after having propagated over the intervening transmission line. The current and voltage will always be equal unless a fault has occurred on the transmission line between the two line terminals. For a three phase transmission line the three-phase currents and voltages are transformed into their modal components for comparison of the modal voltages and currents. Again, the modal voltages and currents will be equal unless a fault has occurred on the line. Similarly, the apparatus of U.S. Pat. No. 3,590,368 compares voltages and currents at two locations after providing for the attenuation and delay associated with propagation over the connecting transmission line. On a three phase basis this is accomplished by transforming the phase voltage and currents into their modal components and comparing the resulting modal voltages and currents. Three comparison equations are developed to allow for identification of the faulted conductor.

Several articles discussing ultra-high speed relaying using traveling waves are also available in the literature. An article entitled "Ultra-High Speed Relay for EHV/UHV Transmission Lines-Development, Design and Application", by M. Chamia and S. Iberman appearing in the *IEEE Transactions on Power Apparatus and Systems,* Vol. PAS-97, No. 6, November/December 1978, page 2104–2116 discloses a protective relay for comparing the polarity of the current and voltage at each line end. For an internal fault both line ends will have changes in current and voltage which are opposite in sign; for an external fault one line end will have changes of equal sign. Further discussion of this protective relay appears in the article, "Ultra-High Speed Relay for EHV/UHV Transmission Lines-Installation-Staged Fault Tests and Operational Experience" by M. T. Yee and J. Estzergalyos, in the *IEEE Transactions on Power Apparatus and Systems,* Vol. PAS-97, No. 5, September/October 1978, pages 1814–1825.

Two additional related articles discuss fault detection using traveling waves: "Fault Protection Based on Travelling Wave Theory-Part I Theory," presented at the IEEE Power Engineering Society Summer Meeting, July 17–22, 1977; and "Fault Protection Based on Travelling Wave Theory-Part II Sensitivity Analysis and Laboratory Test," presented at the IEEE Power Engineering Society Winter Meeting, Jan. 29-Feb. 3, 1978; both articles are authored by Toshio Takagi, Junichi Baba, Katsuhiko Uemura, and Toshiaki Sakaguchi. The articles teach fault detection by comparing the traveling waves at local and remote ends of the transmission line. Using a modal transformation, the same ideas are shown to be applicable to a multiple-conductor transmission line.

Compared with the prior art, the present invention utilizes a new frequency-dependent characteristic admittance model of the transmission line. In addition, it makes novel use of the modal current and voltage propagation vectors at a single line terminal to detect a fault and to determine on which phase conductor the fault is located. These and other advantages of the present invention are discussed below in the description of the preferred embodiment.

SUMMARY OF THE INVENTION

A protective relay for determining the location of a fault on the conductors of a three-phase ac electrical transmission line is disclosed. The protective relay measures the total voltage on each phase conductor at a single line terminal. The three voltage signals are then filtered to remove the steady-state ac frequency components and the resulting filtered signals multiplied by the elements of a characteristic admittance matrix to produce three voltage-derived current signals. The total current on each phase of the transmission line is also measured at a single line terminal and filtered to remove the steady-state ac frequency components. The three filtered current signals and the three voltage-derived current signals are arithmetically combined to produce three incident-wave current signals and three forward-wave current signals. The incident-wave current signals represent the current produced on each conductor by a fault-launched incident traveling wave arriving at the relaying point from a first direction. The three forward-wave current signals represent the current produced on each conductor by a fault-launched forward traveling wave arriving at the relaying point from a second direction. A comparator compares the six current signals to provide an indication of the direction to the fault and an enable signal when the fault is on the protected line segment. The three current signals of the incident wave are filtered to provide a modal signal representing the total current produced on the transmission line by a first propogational mode of the incident traveling wave. A discriminator plots the three incident-wave signals and the modal signal in a series of X-Y planes containing appropriate threshold boundaries. Depending on the boundary crossed, various signals are produced which, when logically combined with the enable signal, provide an indication of the faulted phase conductor.

BRIEF DESCRIPTION OF THE DRAWINGS

The invention may be better understood, and further advantages and uses thereof more readily apparent, when considered in view of the following detailed description of exemplary embodiments, taken with the accompanying drawings in which:

FIG. 4 is a block diagram of the admittance matrix of FIG. 1;

FIG. 6A depicts the threshold boudaries in the X-Y plane for determining if the fault is located on the protected line segment, wherein the incident and forward wave currents on the first phase conductor are graphed on the X-Y plane as a function of time;

FIG. 6B depicts the threshold boundaries in the X-Y plane for determining if the fault is located on the protected line segment, wherein the incident and forward wave currents on the second phase conductor are graphed on the X-Y plane as a function of time;

FIG. 6C depicts the threshold boundaries in the X-Y plane for determining if the fault is located on the protected line segment, wherein the incident and forward wave currents on the third phase conductor are graphed on the X-Y plane as a function of time.

DESCRIPTION OF THE PREFERRED EMBODIMENT

1. FUNDAMENTAL PRINCIPLES

For proper description of the present invention, it is necessary to employ standard sign conventions throughout the specification. Therefore, in this specification a step voltage change will be regarded as producing a positive current into the transmission line, and a current into the transmission line will be regarded as positive.

Figure 1:
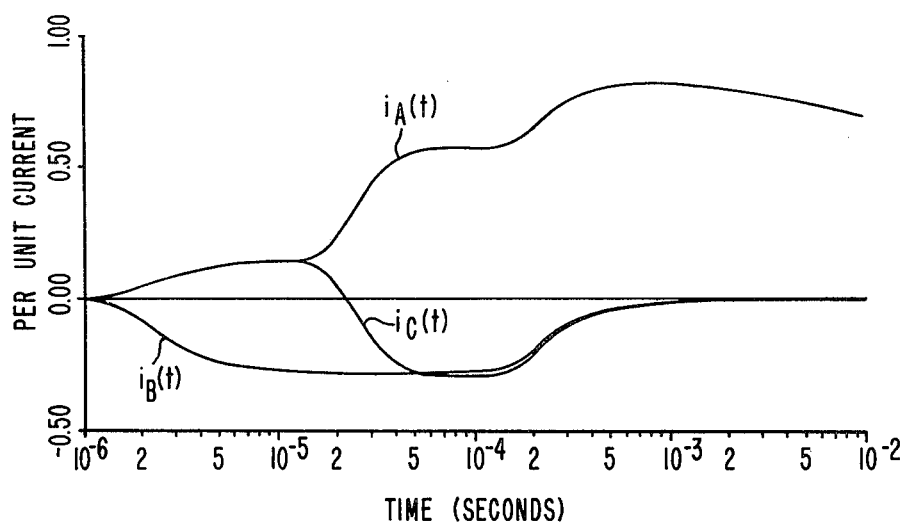
FIG. 1 is a graph showing the current on each phase conductor as a function of time and at a distance from a point where a voltage step input is applied to the first conductor.

The present invention can be better understood by first examining the behavior of a three phase transmission line subjected to voltage steps, because a single line to ground fault produces the same type of transient wave on the transmission line as would a sudden step change in voltage applied to the faulted conductor. Consider a semi-infinite three phase transmission line having a horizontal configuration of phase conductors wherein the middle conductor is designated conductor B and the two outside conductors are designated A and C. If conductor A is subject to a step change in voltage at a point $x=0$, the resulting currents on the conductors A, B, and C as a function of time at $x=200$ miles for a typical 500 kV line are shown in FIG. 1. The Y axis of FIG. 1 represents the normalized positive and negative currents, and the X axis represents time in seconds. The line delay of 1.075 ms has been subtracted by the X coordinate.

Examining FIG. 1, it can be seen that initially the conductors A and C experience a positive current, while conductor B carries a negative current equal to twice the magnitude of the current in either outside conductor. Then, the current in the middle conductor remains constant while the current in conductor A increases further and the current in conductor C decreases until it is approximately equal to the current on conductor B. Finally, all three conductors experience a positive increase in current such that the current on the conductors B and C approaches zero while the conductor A current reaches a maximum positive value before slowly decaying.

Figure 2:
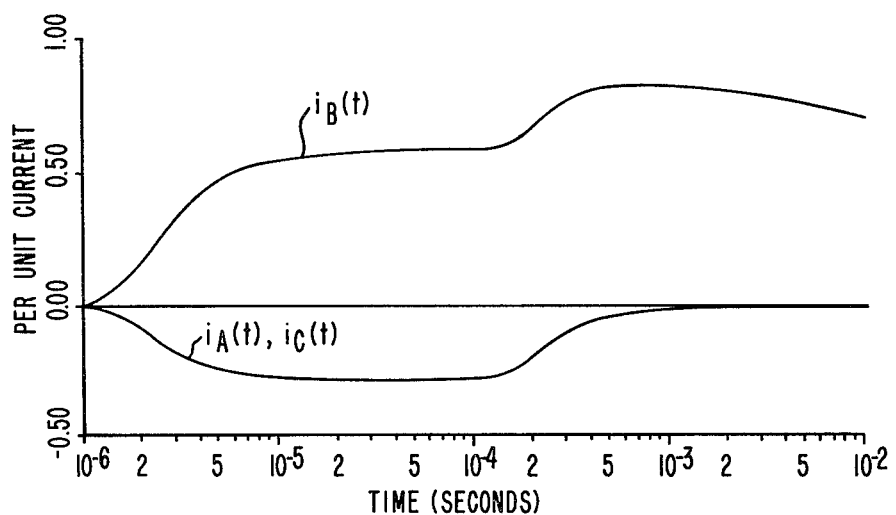
FIG. 2 is a graph showing the current on each phase conductor as a function of time and at a distance from a point where a voltage step input is applied to the second conductor.

FIG. 2 shows the resulting currents when the voltage step is applied to conductor B. In this case the current in the center conductor rises to a positive value equal to twice the negative value of current carried by either outside conductor. All the conductors then experience a positive increase in current such that the currents in the outside conductors approach zero while the current in the center conductor reaches a positive maximum before slowly decaying.

The responses illustrated in FIGS. 1 and 2 can be explained in terms of modal propagation on the transmission line. The currents and voltages on a three-conductor line propagate along the line in three different modes. The currents of each phase conductor maintain approximately constant proportions as a particular mode travels down the line. The first mode, or ground mode, can be approximated by the vector $$\begin{bmatrix} 1 \\ 1 \\ 1 \end{bmatrix}$$

This vector defines the proportion of mode 1 current carried on each of the three conductors. As can be seen, the current components are of equal magnitude and the same sign.

The ground modes of most transmission lines have nearly the same response, i.e. equal magnitude and the same sign. The second and third modes, however, are dependent on the specific geometrical arrangement of the phase conductors. The second and third modes are balanced, that is, the sum of the current components is nearly zero.

For a typical 500 kV horizontal transmission line the second mode has current components described approximately by the vector $$\begin{bmatrix} 1 \\ 0 \\ -1 \end{bmatrix}$$

While the third mode is described approximately by the vector $$\begin{bmatrix} 1 \\ -2 \\ 1 \end{bmatrix}$$

The second vector represents the proportion of mode two currents on the conductors A, B, and C. Similarly, the third vector represents the proportion of mode three currents on the conductors A, B, and C. The third mode exhibits the highest propagation velocity and lowest attenuation. The ground or first mode travels with the slowest velocity and experiences the most attenuation; the second mode is intermediate with respect to both velocity and attenuation.

The limiting factor in the detection of a single line-to-ground fault is the propagation velocity of the ground mode. Before the ground mode arrives, the fault currents are nearly balanced, and all faults therefore initially appear as three phase faults. For single pole switching as accomplished by this invention, fault detection must await and detect the arrival of the ground mode. When the ground mode arrives the protective relay can then determine the faulted phase conductor.

Consider the modal explanation for the response shown in FIG. 1. Let $$T = \begin{bmatrix} 1 & 1 & 1 \\ 1 & 0 & -2 \\ 1 & -1 & 1 \end{bmatrix}$$

be the set of modal current vectors, wherein the three columns of T represent the proportion of the three propagation modes and the three rows of T represent the three phase conductors. The inverse matrix of T is therefore $$T^{-1} = \begin{bmatrix} \tfrac{1}{3} & \tfrac{1}{3} & \tfrac{1}{3} \\ \tfrac{1}{2} & 0 & -\tfrac{1}{2} \\ 1/6 & -\tfrac{1}{3} & 1/6 \end{bmatrix}$$

The matrices T and $T^{-1}$ relate the total current carried by each conductor as a function of time to the modal currents as a function of time. That is, $$\begin{bmatrix} i_A(t) \\ i_B(t) \\ i_C(t) \end{bmatrix} = T \begin{bmatrix} m_1(t) \\ m_2(t) \\ m_3(t) \end{bmatrix} \text{ and } T^{-1} \begin{bmatrix} i_A(t) \\ i_B(t) \\ i_C(t) \end{bmatrix} = \begin{bmatrix} m_1(t) \\ m_2(t) \\ m_3(t) \end{bmatrix}$$

Wherein $i_A(t)$, $i_B(t)$ and $i_C(t)$ represent the currents as a function of time on each phase conductor; and $m_1(t)$, $m_2(t)$, and $m_3(t)$ represent the modal currents as a function of time.

The above equations will now be used to construct the current responses shown in FIG. 1. If a step voltage is applied to the phase conductor A the current produced as a result thereof can be decomposed into the three modal currents by using the matrix $T^{-1}$ as shown below.

$$T^{-1} \begin{bmatrix} 1 \\ 0 \\ 0 \end{bmatrix} = \begin{bmatrix} m_1(t) \\ m_2(t) \\ m_3(t) \end{bmatrix}$$

$$\begin{bmatrix} \tfrac{1}{3} & \tfrac{1}{3} & \tfrac{1}{3} \\ \tfrac{1}{2} & 0 & -\tfrac{1}{2} \\ 1/6 & -\tfrac{1}{3} & 1/6 \end{bmatrix} \begin{bmatrix} 1 \\ 0 \\ 0 \end{bmatrix} = \begin{bmatrix} \tfrac{1}{3} \\ \tfrac{1}{2} \\ 1/6 \end{bmatrix}$$

Recall that the application of a step voltage to conductor A is identical to the effect of a fault on that conductor. Now, the matrix T is used to determine how the modal components, $$\begin{bmatrix} \tfrac{1}{3} \\ \tfrac{1}{2} \\ 1/6 \end{bmatrix}$$

are distributed among the three phase conductors.

$$\begin{bmatrix} i_A(t) \\ i_B(t) \\ i_C(t) \end{bmatrix} = T \begin{bmatrix} m_1(t) \\ m_2(t) \\ m_3(t) \end{bmatrix}$$

$$\begin{bmatrix} i_A(t) \\ i_B(t) \\ i_C(t) \end{bmatrix} = \begin{bmatrix} 1 & 1 & 1 \\ 1 & 0 & -2 \\ 1 & -1 & 1 \end{bmatrix} \begin{bmatrix} \tfrac{1}{3} \\ \tfrac{1}{2} \\ 1/6 \end{bmatrix}$$

Carrying out the vector multiplication, $$\begin{bmatrix} \tfrac{1}{3} + \tfrac{1}{2} + 1/6 \\ \tfrac{1}{3} + 0 - \tfrac{1}{3} \\ \tfrac{1}{3} - \tfrac{1}{2} + 1/6 \end{bmatrix} = \begin{bmatrix} 1 \\ 0 \\ 0 \end{bmatrix} \quad (1)$$

Since this vector equals the current vector representing a fault or voltage step on the first conductor, the validity of this method is proven.

The three columns of the vector of equation (1), before the elements are summed, represent the modal current components, and the three rows represent the three phase conductors. The responses of FIG. 1 can be reconstructed from this vector. The mode three current components, represented by the last column of the vector of equation (1) arrive first. Therefore, focusing on the per unit currents of FIG. 1 from a time of $10^{-6}$ through $2 \times 10^{-5}$ seconds, it can be seen that the current magnitudes on conductors A, B, and C are 1/6, $-\tfrac{1}{3}$, and 1/6 respectively. These values are taken from the last column of the vector of equation (1). When the second mode arrives, the current magnitude on each of the three conductors is represented by the sum of the last and middle columns of the vector of equation (1). For a time of approximately $2 \times 10^{-5}$ through $2 \times 10^{-4}$ seconds the per unit currents on conductors A, B, and C are therefore $\tfrac{2}{3}, -\tfrac{1}{3}$, and $-\tfrac{1}{3}$ respectively. When the slowest mode, the ground mode, finally arrives the current magnitudes on each conductor are represented by the sum of all three columns of the vector of equation (1). The per unit current on conductor A reaches a value of one while the per unit current on the conductors B and C is zero. This response indicates that the fault has occurred on conductor A.

A similar analysis can be performed for a step voltage change or simulated fault on the conductor B. Using $T^{-1}$ to calculate the modal currents $$T^{-1} \begin{bmatrix} 0 \\ 1 \\ 0 \end{bmatrix} = \begin{bmatrix} m_1(t) \\ m_2(t) \\ m_3(t) \end{bmatrix}$$

$$\begin{bmatrix} \tfrac{1}{3} & \tfrac{1}{3} & \tfrac{1}{3} \\ \tfrac{1}{2} & 0 & -\tfrac{1}{2} \\ 1/6 & -\tfrac{1}{3} & 1/6 \end{bmatrix} \begin{bmatrix} 0 \\ 1 \\ 0 \end{bmatrix} = \begin{bmatrix} \tfrac{1}{3} \\ 0 \\ -\tfrac{1}{3} \end{bmatrix}$$

The resulting modal components are now used to determine the amount of each mode on each conductor by using the matrix T.

$$\begin{bmatrix} i_A(t) \\ i_B(t) \\ i_C(t) \end{bmatrix} = T \begin{bmatrix} m_1(t) \\ m_2(t) \\ m_3(t) \end{bmatrix} \quad (2)$$

$$\begin{bmatrix} i_A(t) \\ i_B(t) \\ i_C(t) \end{bmatrix} = \begin{bmatrix} 1 & 1 & 1 \\ 1 & 0 & -2 \\ 1 & -1 & 1 \end{bmatrix} \begin{bmatrix} \frac{1}{3} \\ 0 \\ -\frac{1}{3} \end{bmatrix} = \begin{bmatrix} \frac{1}{3}+0-\frac{1}{3} \\ \frac{1}{3}+0+\frac{2}{3} \\ \frac{1}{3}+0-\frac{1}{3} \end{bmatrix} = \begin{bmatrix} 0 \\ 1 \\ 0 \end{bmatrix}$$

The elements of the vector of equation (2), before addition, are used to graph the responses of FIG. 2. Arrival of the third mode produces a per unit current on the conductors A, B, and C of $-\frac{1}{3}$, $\frac{2}{3}$ and $-\frac{1}{3}$ respectively. In this situation there are no mode two components. The mode one components, having a magnitude of $\frac{1}{3}$ per unit current, cause the total current on conductors A and C to rise to zero as shown in FIG. 2. The total current on conductor B increases to one before slowing decaying. These response curves indicate a fault or positive voltage step applied to conductor B. The graphs of FIGS. 1 and 2 form the basis of the present invention as will be described in detail hereinafter.

Response curves for a fault or a step voltage change on conductor C will not be discussed. The response would be identical to that shown in FIG. 1 except the subscripts A and C designating the conductors would simply be reversed.

It should be noted from FIGS. 1 and 2 that prior to the arrival of the ground mode (the first mode) the value of the current on both of the unfaulted conductors is equal to $-\frac{1}{2}$ the value of the current on the faulted conductor. This is true whether the single line to ground fault is on the center or either outside conductor. This feature is also essential to the present invention and will be discussed in more detail hereinafter.

The incident wave current signals measured at the end of a 200 mile transmission line would differ from those that appear in FIGS. 1 and 2 due to reflections at the bus termination impedance and the fault. An incident wave produced at the fault and launched toward the protective relay at the end of the transmission line would have currents represented by FIGS. 1 or 2. Upon striking the bus the incident wave would cause the generation of a reflected wave which would be launched toward the fault. Upon arrival at the fault the reflected wave would cause a second incident wave to be launched from the fault toward the transmission line terminal and the protective relay located there. To avoid interference of the second incident wave with the first incident wave, measurement of the first incident wave must occur in a time given by $\Delta T = 2XC$, where X is the distance between the fault and the protective relay and C is the velocity of light.

If $Y_o(t)$ is the impulse response of the surge (or characteristic) admittance of the transmission line, then a forward wave current propagated at the bus is given by the convolution of $Y_o(t)$ with the applied voltage vector $E_F(t)$, that is $$I_F(t) = \int_{-\infty}^{t} Y_o(t - \tau) E_F(\tau) d\tau \tag{3}$$

using an asterisk to denote the convolution operation of equation (3), $$I_F = Y_o * E_F \tag{4}$$

$$Y_o * E_F - I_F = 0$$

Similarily, an incident wave current measured by a protective relay near a bus where the line is terminated by $Y_o$ such that no reflections occur is given by $$I_G = -Y_o * E_G \tag{5}$$

$$Y_o * E_G + I_G = 0$$

In general, a line will not be terminated by $Y_o$ and thus both incident and forward waves are simultaneously present. Assuming that E is the total bus voltage and I is the total bus current, then given the adopted sign conventions $$E = E_F + E_G \text{ and} \tag{6}$$

$$I = I_F + I_G \tag{7}$$

Using equations 4 through 7, the forward wave current ($I_F$) and the incident wave current ($I_G$) can be derived in terms of the characteristic admittance, the total bus voltage, and the total bus current. That is, $$I_F = \tfrac{1}{2}(Y_o * E + I) \tag{8}$$

$$I_G = \tfrac{1}{2}(I - Y_o * E) \tag{9}$$

By definition, incident wave current is independent of the termination admittance. The value of the reflected wave current is, however, dependent on the line termination admittance.

2. DESCRIPTION AND OPERATION OF THE INVENTION

Figure 3:
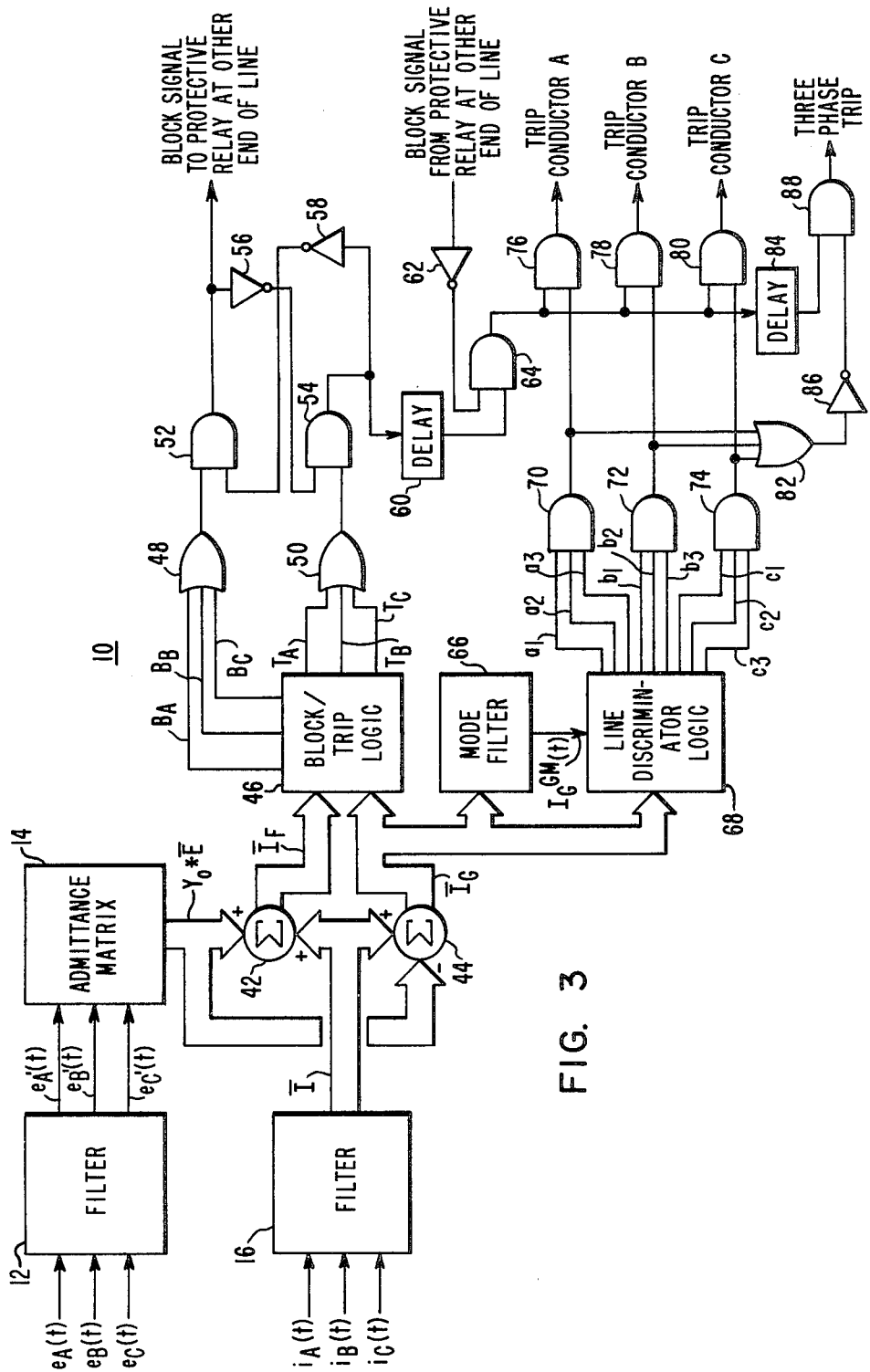
FIG. 3 is a block diagram of the protective relay constucted according to the teachings of the present invention.

The components of a protective relay 10 constructed according to the teachings of the present invention are illustrated in FIG. 3. In FIG. 3, a single-line signal flow path represents the flow path of a single voltage or current, and a double-line signal flow path represents the flow paths of current or voltage vectors.

$e_A(t)$ represents the voltage on conductor A as a function of time; $e_B(t)$ represents the voltage on conductor B as a function of time; $e_C(t)$ represents the voltage on conductor C as a function of time. Similarly, $i_A(t)$, $i_B(t)$, and $i_C(t)$ represent the current on conductors A, B, and C, respectively, as a function of time.

The voltage signals $e_A(t)$, $e_B(t)$, and $e_C(t)$ are input to a filter 12 wherein the steady-state 60 Hz components of the three voltage signals are removed. The filter 12 also provides band-pass filtering with a pass band of approximately 10 Hz to 20 kHz to eliminate unwanted portions of the frequency spectrum. Filtered voltage signals $e_A'(t)$, $e_B'(t)$, and $e_C'(t)$ (collectively referred to as E are input to an admittance matrix 14 which duplicates the characteristic admittance of the transmission line in the pass band frequency range. The three current signals $i_A(t)$, $i_B(t)$, and $i_C(t)$ are input to a filter 16. The filter 16 also removes the steady state 60 Hz components of the three current signals and limits the frequency spectrum of these three current signals to approximately 10 Hz to 20 kHz. The output signal from the filter 16 is represented by a double signal flow path labeled I in FIG. 3.

A block diagram of the admittance matrix 14 is illustrated in FIG. 4. The admittance matrix 14 is a representation, in the form of a 3×3 matrix, of the characteristic admittance of the transmission line in the pass band frequency range. Filters 18, 20, and 22 of the admittance matrix 14 are responsive to the voltage signal $e_A'(t)$.

Filters 24, 26, and 28 are responsive to the voltage signal $e_B'(t)$; and filters 30, 32, and 34 are responsive to the voltage signal $e_C'(t)$. The output signals from the filters 18, 24, and 30 are summed in a summing device 36; the output signals from the filters 20, 26, and 32 are summed in a summing device 38; the output signals from the filters 22, 28, and 34 are summed in a summing device 40. The output signals from the summing devices 36, 38, and 40 are represented by the vector quantity $Y_o*E$ as shown in FIG. 4. Each of the filters 18, 20, 22, 24, 26, 28, 30, 32, and 34 have the appropriate magnitude and phase characteristics such that the output from the admittance matrix 14 is equal to the characteristic admittance of the transmission line convolved with the voltages input thereto (i.e., E or $e_A'(t)$, $e_B'(t)$, and $e_C'(t)$).

Figure 5A:
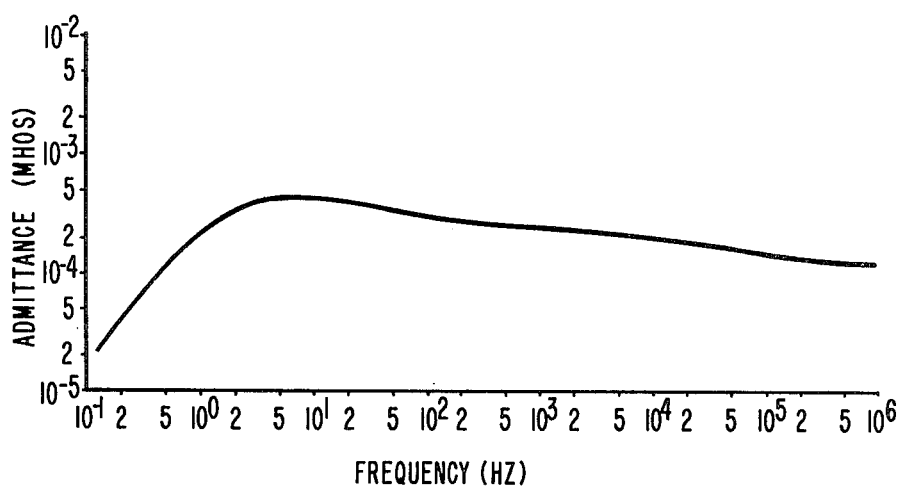
FIGS. 5A and 5B are graphs of the magnitude and phase response for one element of the admittance matrix of FIG. 4.
Figure 5B:
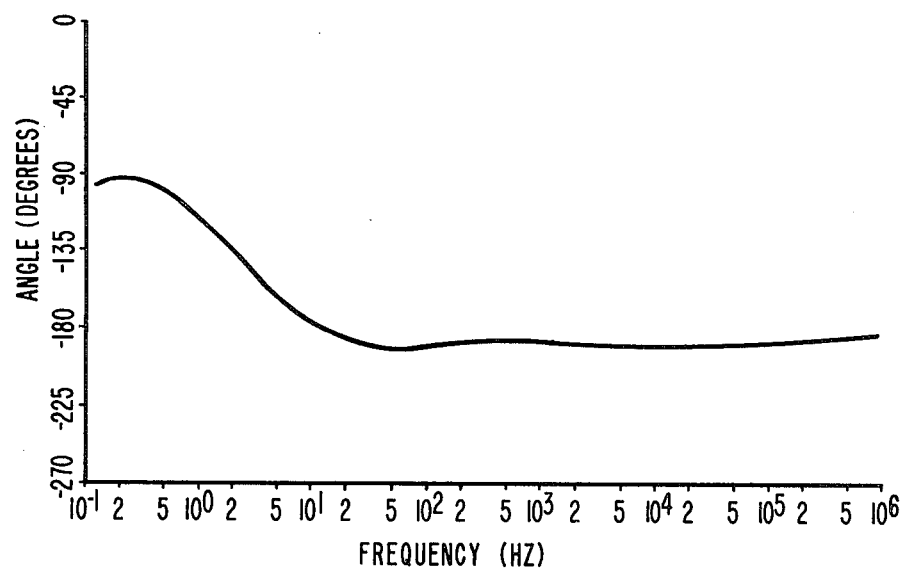

Techniques for modeling the admittance matrix, $Y_o$, are well known in the art. FIG. 5A shows the magnitude response and FIG. 5B the phase response for element $Y_{o,13}$ as modeled for the instant invention. After calculating the phase and magnitude responses for all elements of the $Y_o$ matrix the results were used to design the filters 18, 20, 22, 24, 26, 28, 30, 32, and 34.

Returning to FIG. 3, the vector signals I and $Y_o*E$ are input to summing devices 42 and 44. In the summing device 42 the two signals input thereto are added to produce the incident wave current, $I_F$, as represented by equation (8) above. In the summing device 44, $Y_o*E$ is subtracted from I to produce the incident wave current, $I_G$, as calculated in equation (9).

The signals $I_F$ and $I_G$ are input to a block/trip logic element 46 for determining whether incident or forward wave signals dominate. The details of the block/trip logic element 46 will be discussed hereinafter. The block/trip logic element 46 produces three block signals, one for each phase conductor, designated $B_A$, $B_B$, and $B_C$ in FIG. 3. The block/trip logic element 46 also produces three trip signal, again one for each phase conductor, designated $T_A$, $T_B$, and $T_C$. The block signals $B_A$, $B_B$, and $B_C$ are input to an OR gate 48; the trip signals $T_A$, $T_B$ and $T_C$ are input to an OR gate 50. When an output signal from the OR gate 48 is in a high state this denotes an excess of forward wave activity over incident wave activity on one or more of the three phase conductors. When an output signal from the OR gate 50 is high, this denotes an excess of incident wave activity over forward wave activity on one of the three phase conductors. The excessive forward wave activity is caused by a fault behind the bus; the excessive incident wave activity is caused by a fault on the protected line segment. An output signal from the OR gate 50 is input to a first input terminal of an AND gate 54. A second input terminal of the AND gate 52 is responsive to an output terminal of the AND gate 54 via an inverter 58. A second input terminal of the AND gate 54 is responsive to an output terminal of the AND gate 52 via an inverter 56. When there is an excess of forward wave activity over incident wave activity on at least one conductor of the protected line segment, (indicating that a fault has occurred behind the bus) the first input terminal of the AND gate is high. Also, under these conditions the signals $T_A$, $T_B$, and $T_C$ will be low and therefore the second input terminal of the AND gate 52 is high. The AND gate 52 thus produces a high-state block signal to the protective relay at the other end of the transmission line (not shown in FIG. 3). The block signal prevents the other protective relay from tripping despite the fact that this protective relay sees an incident traveling wave from the fault occurring behind the bus.

When there is an excess of incident wave activity over forward wave activity on at least one conductor of the protected line segment (indicating that a fault has occurred on the protected line segment) the first and second input terminals of the AND gate 54 will be high causing a trip signal to be produced at the output terminal thereof. The trip signal is input to a delay element 60. As can be seen, the AND gates 52 and 54 and the inverters 56 and 58 prevent the simultaneous occurrence of a block signal and a trip signal. The first of the trip signal or the block signal to go to a high state blocks the other signal from changing to a high state.

FIGS. 6A, 6B and 6C graphically depict the threshold boundaries implemented in the block/trip element 46 and used by the block/trip logic element 46 to determine whether incident or forward wave activity predominates. As shown in FIG. 3, the signals input to the block/trip logic element 46 include: three current signals representative of the current on each phase conductor produced by an incident traveling wave (designated $I_G^A(t)$, $I_G^B(t)$, and $I_G^C(t)$, wherein the subscript G represents an incident wave and the superscripts represent each phase conductor) and three current signals representing a current on each phase conductor produced by a forward traveling wave (designated $I_F^A(t)$, $I_F^B(t)$, and $I_F^C(t)$, wherein the subscript F represents a current produced by a forward traveling wave and the superscripts represent the three phase conductors).

Focusing on FIG. 6A, it is seen that the incident wave current on conductor A is graphed as a function of time on the X axis and the forward wave current on conductor B is graphed as a function of time on the Y axis. Depending on the relative values of the forward and incident wave currents on the first phase conductor, the graph of FIG. 6A will take the form of an elliptical trajectory with respect to time. Four threshold boundaries or cones are also shown in FIG. 6A. Two cones are centered about the positive and negative X axis, and two narrower cones are centered about the positive and negative Y axis; the areas of the X-Y plane encompassed by the four cones are mutually exclusive. If the elliptical trajectory crosses into either of the cones centered about the X axis the signal $T_A$ is set equal to a binary one. This indicates a predominance of incident wave activity on phase conductor A and if a block signal is not eventually received from a protective relay at the other end of the transmission line the protective relay 10 will cause phase conductor A to be tripped. If the elliptical trajectory crosses into either of the cones centered about the Y axis the block signal $B_A$ will be set equal to a binary 1 thereby indicating a predominance of forward wave activity on phase conductor A. When there is insufficient incident or forward wave activity to cause the eliptical trajectory to cross into either of the four cones both $T_A$ and $B_A$ equal binary zero.

The shape of the cones in the X-Y plane is critical and will now be discussed in greater detail. The cones centered on the Y axis are narrower than those on the X axis. When a transient occurs behind the bus, a forward wave is launched onto the protected line segment. Assuming no other transient signals are propagated on the protected line segment, the elliptical trajectory in the $I_G^A(t)$-$I_F^A(t)$ plane would lie entirely on the Y axis (the $I_F^A(t)$ axis). There would be no incident wave on the protected line segment. To allow for noise, imperfect modeling of the characteristic admittance of the transmission line (which is used to calculate the incident and forward wave currents), and the typical amount of incident wave activity caused by synchronous power flow on the transmission line, the cones centered about the Y axis are broader than simple line segments. Thus, forward wave activity with very little incident wave activity causes the production of a block signal.

The cones centered about the X axis are broader than those centered about the Y axis because the phenomenon that occurs when an incident wave hits the bus is quite different from a forward wave hitting the bus. In the unlikely situation where the bus impedance matches the characteristic impedance of the transmission line, an incident wave hitting the bus is absorbed without causing a forward or reflected wave to be launched on the protected line segment. In this unlikely situation the trajectory in the $I_G^A(t)$-$I_F^A(t)$ plane would lie entirely on the X axis. Since the bus impedance does not usually equal the the characteristic impedance of the transmission line, an incident wave arriving at the bus produces a substantial forward or reflected wave.

The two boundary conditions which define the asymptotes of the cones centered about the X axis are the case of zero bus impedance and infinite bus impedance. For zero bus impedance the change of bus voltage is zero such that $I_F^A = I_G^A$. When the bus impedance is infinite, the change in bus current is zero such that $I_F^A(t) = -I_G^A(t)$. Thus the cones centered about the X axis are defined by the two lines in the X-Y plane having slopes of $+1$ and $-1$.

Consideration should also be given to the points on the X axis where the vertical lines of the broader cones across the X axis and to those points on the Y axis where the horizontal lines of the narrower cones cross the Y axis. It should be noted that the generators of the electrical power system swing in frequency at a rate of 1 or 2 Hz per second to bring the entire system into synchronization. This generator swinging causes generation of forward and incident transient waves. The four points where the cones cross their respective axis are selected so that normal excursions due to this generator swinging do not cause $T_A$ or $B_A$ to be set equal to a binary one.

The elliptical projections produced by the block/trip logic element 46 for the conductors B and C are similar to those discussed in conjunction with FIG. 6A. The X-Y plane for the phase B conductor is illustrated in FIG. 6B wherein $I_G^B(t)$ is plotted on the X axis and $I_F^B(t)$ is plotted on the Y axis. FIG. 6C depicts the X-Y plane for conductor C wherein $I_G^C(t)$ is plotted on the X axis and $I_F^C(t)$ is plotted on the Y axis.

Returning to FIG. 3, an output terminal of the delay element 60 is input to the first input terminal of an AND gate 64. A second input terminal of the AND gate 64 is responsive to a block signal from the protective relay at the other end of the transmission line via an inverter 62. Receipt of the block signal prevents the protective relay 10 from producing a trip signal as will be discussed hereinafter. The block signal indicates that a fault has occurred behind the bus at the other end of the transmission line. Therefore, while the protective relay 10 sees an incident traveling wave, this incident traveling wave is not caused by a fault on the protected line segment and therefore the protective relay 10 should not trip one or more phase conductors. The delay element 60 is inserted to insure that the protective relay 10 does not produce a trip signal until sufficient time has elapsed for a block signal to be received from the protective relay at the other end of the transmission line.

The incident wave current signal, $I_G$, is also input to a mode filter 66 and a line discriminator logic circuit 68. The mode filter 66 produces the ground mode of the incident current wave by algebrically summing the three components of $I_G$. The line discriminator logic circuit 68, which will be discussed in more detail hereinafter, determines whether a single phase fault has occurred and produces a trip signal tripping one or all three of the phase conductors. The line discriminator logic circuit 68 produces nine signals which are used to trip the appropriate phase conductors. These nine signals are designated and connected as shown in FIG. 3 as follows: $a_1$ is input to a first input terminal of an AND gate 70, $a_2$ is input to a second input terminal of the AND gate 70, $a_3$ is input to a third input terminal of the AND gate 70, $b_1$ is input to a first input terminal of an AND gate 72, $b_2$ is input to a second input terminal of the AND gate 72, $b_3$ is input to a third input terminal of the AND gate 72, $c_1$ is input to a first input terminal of an AND gate 74, $c_2$ is input to a second input terminal of the AND gate 74, $c_3$ is input to a third input terminal of the AND gate 74.

An output terminal of the AND gate 70 is connected to a first input terminal of an AND gate 76. An output terminal of the AND gate 64 is connected to a second input terminal of the AND gate 76. The AND gate 76 produces a signal for tripping phase conductor A. An output terminal of the AND gate 72 is connected to a first input terminal of an AND gate 78. The second input terminal of the AND gate 78 is connected to the output terminal of the AND gate 64. The AND gate 78 produces a signal for tripping phase conductor B. An output terminal of the AND gate 74 is connected to a first input terminal of an AND gate 80. A second input terminal of the AND gate 80 is connected to the output terminal of the AND gate 64. The AND gate 80 produces a signal for tripping phase conductor C.

The output terminals of the AND gates 70, 72, and 74 are also input, respectively, to a first, a second, and a third input terminal of an OR gate 82. An output terminal of the OR gate 82 is input to a first input terminal of an AND gate 88 via an inverter 86. The output terminal of the AND gate 64 is also input to a delay element 84. An output terminal of the delay element 84 is input to a second input terminal of the AND gate 88. The AND gate 88 produces a signal for tripping all three phase conductors when the protective relay 10 has established a trip condition, but is unable to determine on which phase conductor the fault has occurred. This three-phase trip condition is established after a delay imposed by the delay element 84.

Figure 7:
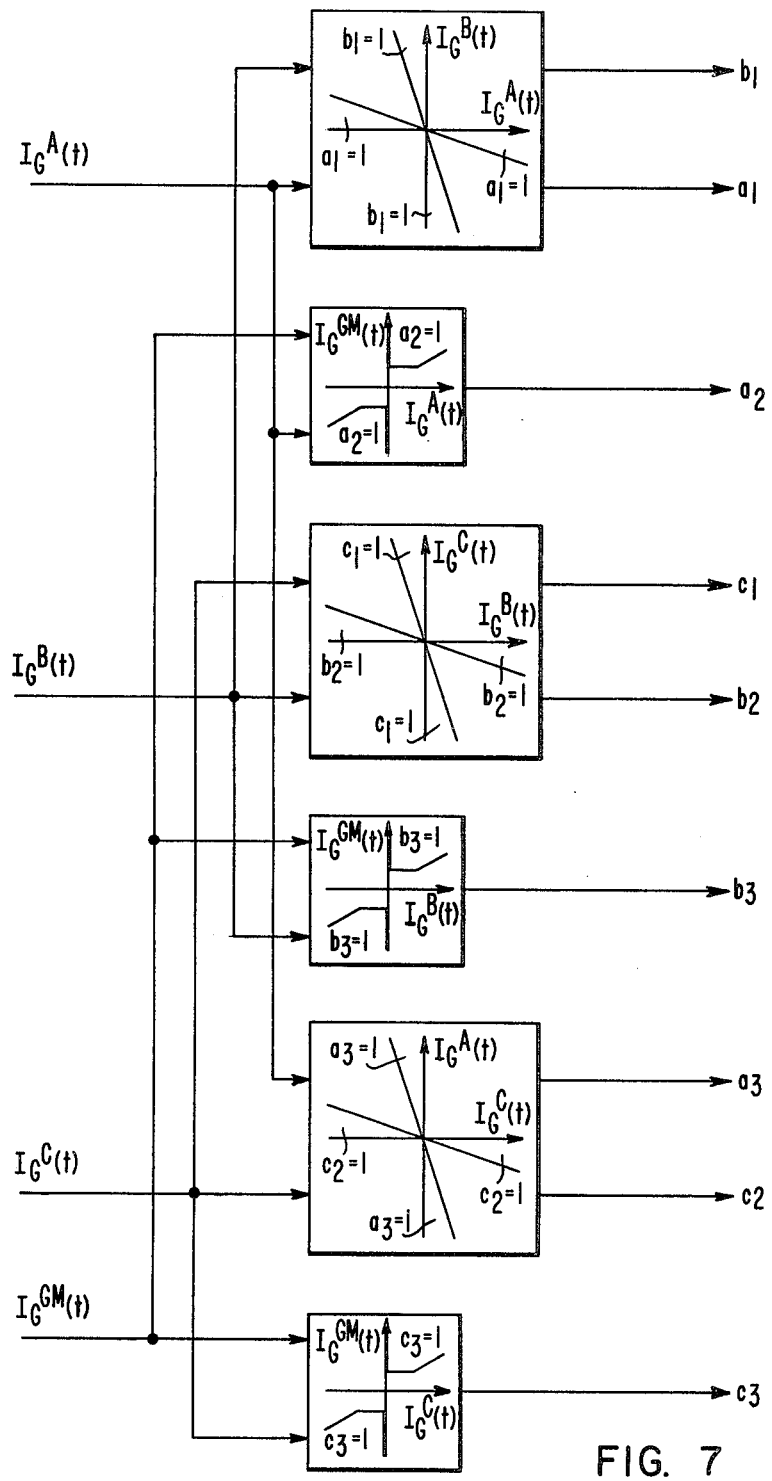
FIG. 7 depicts the threshold boundaries for determining on which phase conductor the fault is located.

Details of the signal comparison logic in the line discriminator logic circuit 68 are illustrated in FIG. 7. Whereas the block/trip logic element 46 compares the incident and forward wave currents for each phase conductor, the line discriminator logic circuit 68 utilizes only the incident wave currents to make comparisons between phase conductors. As discussed in conjunction with FIG. 3, the signals input to the line discriminator logic circuit 68 are the ground mode incident wave signal ($I_G^{GM}(t)$), and the three incident wave current signals as functions of time ($I_G^A(t)$, $I_G^B(t)$, and $I_G^C(t)$).

The line discriminator logic circuit 68 produces nine output signals by plotting the four signals input thereto in six different X-Y planes and determining when the trajectories formed by those signals as a function of time cross the various boundaries in the X-Y planes. In the uppermost X-Y plane of FIG. 7 the incident wave current on phase conductor A ($I_G^A(t)$) is plotted on the X axis as a function of time and the incident wave current on conductor B ($I_G^B(t)$) is plotted on the Y axis as a function of time. Four threshold boundaries, two designated the $a_1$ boundaries and two designated the $b_1$ boundaries, are also identified in the $I_G^A(t)$-$I_G^B(t)$ plane. The signal $a_1$ is set equal to binary one when the trajectory crosses into one of the two $a_1$ boundaries; the signal $b_1$ is set equal to a binary one when the trajectory crosses into one of the two $b_1$ boundaries.

Derivation of the $a_1$ and $b_1$ boundaries is based on the operational theory of the present invention as discussed in the preceding section. Recall that the unfaulted phase conductors have signal values equal to $-\frac{1}{2}$ the value of the faulted conductor just prior to arrival of the ground mode current component. Thus the $a_1$ threshold boundary is bounded by the $I_G^A(t)$ axis (or a line very close thereto) and a line passing through the origin with a slope of $-\frac{1}{2}$ (or a line very close thereto). In this region $$0 \geq I_G^B \geq (-\tfrac{1}{2})I_G^A \text{ for } I_G^A > 0$$

$$0 \leq I_G^B \leq (-\tfrac{1}{2})I_G^A \text{ for } I_G^A < 0$$

Satisfaction of these equations is a necessary condition, but not a sufficient condition, for concluding that conductor A is faulted. The $b_1$ threshold boundaries are bounded by the $I_G^B(t)$ axis (or a line very close thereto) and a line passing through the origin with a slope of $-2$ (or a line very close thereto). In this region $$0 \geq I_G^A \geq (-\tfrac{1}{2})I_G^B \text{ for } I_G^B > 0$$

$$0 \leq I_G^A \leq (-\tfrac{1}{2})I_G^B \text{ for } I_G^B < 0$$

Satisfaction of these equations is a necessary condition, but not a sufficient condition, for concluding that conductor B is faulted.

Thus, the signal $a_1$ is set equal to one by the line discriminator logic circuit 68 when the trajectory passes into either of the $a_1$ threshold boundaries. Similarly, the $b_1$ signal is set equal to one when the trajectory passes into either of the $b_1$ threshold boundaries. The regions wherein $a_1$ or $b_1$ are set equal to one are adjustable and can be optimized in other embodiments of the present invention for application to transmission lines whose modal current vectors differ from those discussed above.

Similarly, in the third X-Y plane of FIG. 7 the signal $I_G^B(t)$ is plotted on the X axis and the signal $I_G^C(t)$ is plotted on the Y axis. The threshold boundaries designated $b_2$ in the $I_G^B(t)$-$I_G^C(t)$ plane are defined by the X axis and a line passing through the origin with a slope of $-\frac{1}{2}$. Third and fourth boundaries, designated $c_1$, are formed by the Y axis and a line having a slope of $-2$ and crossing through the origin. When the trajectory in the $I_G^B(t)$-$I_G^C(t)$ plane passes through the $b_2$ threshold boundaries the signal $b_2$ is set equal to one, and when the trajectory passes through the $c_1$ boundaries the signal $c_1$ is set equal to binary one.

In the fifth X-Y plane of FIG. 7 the signal $I_G^C(t)$ is plotted on the X axis while the $I_G^A(t)$ is plotted on the Y axis. First and second boundaries defined by the X axis and a line passing through the origin with a slope of $-\frac{1}{2}$ are designated $c_2$. Third and fourth boundaries in the $I_G^C(t)$-$I_G^A(t)$ plane are defined by the Y axis and the line having a slope of $-2$ and passing through the origin. The third and fourth boundaries are designated $a_3$. When the trajectory of the $I_G^C(t)$-$I_G^A(t)$ plane pass into the boundaries designated $c_2$, the signal $c_2$ is set equal to binary one. Likewise, when the trajectory crosses into the boundaries designated $a_3$, the signal $a_3$ is set equal to binary one.

The second, fourth, and sixth X-Y planes of FIG. 7 depict elements of the line discriminator logic circuit 68 receiving the ground mode signal $I_G^{GM}(t)$ and the incident wave current signal on one of the three conductors to produce a logic signal. Recall that as the ground mode current develops to full value the signals on the unfaulted conductors approach zero while the signal on the faulted conductor monotonically approaches the peak value thereof. Therefore, the purpose of this comparison process is to confirm that the ground mode current is a significant component of the phase conductor current signal having the greatest magnitude, and that the polarity of the ground mode agrees with the polarity of this phase conductor signal.

In the second X-Y plane of FIG. 7 the incident wave current signal on phase conductor A, $I_G^A(t)$, is plotted on the X axis and the ground mode signal $I_G^{GM}(t)$ is plotted on the Y axis. Plotting of the signals $I_G^A(t)$ and $I_G^{GM}(t)$ results in the formation of a trajectory in the X-Y plane. Two boundaries, designated $a_2$ are also shown in the X-Y plane. When the trajectory crosses into either of these boundaries the signal $a_2$ is set equal to binary one indicating that the magnitude of $I_G^{GM}(t)$ is a significant component of the signal $I_G^A(t)$ and of the correct polarity.

Once again, referring to the previous discussion on the theory of the protective relay 10 and utilizing the modal vector values previously given, the ground mode has a value of approximately $\frac{1}{3}$ of the incident wave current on the faulted conductor. Thus, the asymptote defining the region where $a_2$ is set equal to 1 has a slope of slightly less than $\frac{1}{3}$. The threshold boundary in the first quadrant of the $I_G^A(t)$-$I_G^{GM}(t)$ plane is defined by a line having $\frac{1}{3}$ slope and a Y-intercept at the origin of the X-Y plane, by the positive Y axis, and by a line having zero slope and crossing the Y axis at a point such that the trajectory produced by normal system operation and noise does not result in the signal $a_2$ being set equal to one. The threshold boundary in the third quadrant of the $I_G^A(t)$-$I_G^{GM}(t)$ plane is defined by a line having $\frac{1}{3}$ slope and a Y-intercept at the origin of the X-Y plane, by the negative Y axis, and by a line having zero slope and intercepting the Y axis at a point such that the trajectory produced by normal operation of the transmission system and noise does not cause the trajectory to cross into the threshold boundary in the third quadrant. The threshold boundaries in the first and third quadrants can be modified to account for different system characteristics.

The fourth X-Y plane of FIG. 7 is similar to the second X-Y plane with the exception that the signal $I_G^B(t)$ is plotted on the X axis and the signal $I_G^{GM}(t)$ is plotted on the Y axis. When the trajectory crosses into the boundary in the first and third quadrant the signal $b_3$ is set equal to a binary one. Similarly, in the sixth X-Y plane of FIG. 7 the signal $I_G^C(t)$ is plotted on the X axis while the signal $I_G^{GM}(t)$ is plotted on the Y axis. When the trajectory crosses into a threshold boundary in the first or third quadrant the signal $c_3$ is set equal to one.

Referring to FIG. 3, and as discussed in conjunction therewith, the signals $a_1$, $a_2$, and $a_3$, are input to the AND gate 70. When all inputs to the AND gate 70 are a binary one, the output of the AND gate 70 is also a binary one. If a block signal has not been received from the protective relay at the other end of the protected line segment, and the block/trip logic element 46 has determined that there is a predominance of incident wave activity over forward wave activity then the output signal of the AND gate 64 will be high. When the high output signals from the AND gates 64 and 70 are input to the AND gate 76, the AND gate 76 produces a signal for tripping phase conductor A. In a similar manner the signals $b_1$, $b_2$, and $b_3$ are input to the AND gate 72. If incident wave activity predominates over forward wave activity and a block signal has not been received from the protective relay at the other end of the protected line segment, the AND gate 78 will produce a signal for tripping phase conductor B. Lastly, when the signals $c_1$, $c_2$, and $c_3$, are each equal to a binary one, thereby indicating a fault on the phase conductor C, the AND gate 74 produces a high output signal. If a block signal has not been received from the protective relay at the other end of the protected line segment and the block/trip logic element 46 indicates a predominance of incident wave activity, then the AND gate 80 produces a signal tripping phase conductor C. Also, as previously discussed the AND gate 88 produces a signal for tripping all three phase conductors when the line discriminator logic circuit 68 cannot determine on which phase the fault has occurred.

In addition to the above-described protective relay apparatus, the present invention also consists of a method of determining the location of a fault on a three phase ac electrical transmission line. Three incident-wave signals representative of the current produced on each conductor by a fault-launched incident traveling wave arriving at the relaying point from a first direction are provided. Three forward-wave signals representative of the current produced on each conductor by a fault-launched forward traveling wave arriving at the relaying point from a second direction are also provided. The incident-wave current signals are compared with the respective forward-wave signals to provide an indication of the direction to the fault and to provide an enable signal when the fault is in the first direction. The three incident-wave current signals are filtered to provide a modal signal representing the total current produced on the transmission line by a first propagational mode of said first incident traveling wave. A discriminator processes the three incident-wave signals, the modal signal, and the enable signal to provide an indication of the location of the fault.

Having now discussed the protective relay 10 in detail the further advantages of the present invention can be more easily understood. Greater discrimination between the incident and forward waves, and therefore greater reliability in detecting line faults and greater security against false operation, is obtained by modeling the frequency dependent nature of the characteristic admittance of the transmission line. Greater discrimination among phases for single line to ground faults and single phase tripping is obtained from the line discriminator logic circuit 68 as implemented by the threshold boundaries of FIG. 7. These threshold boundaries can be optimized to particular modal current vectors, dependent on transmission system characteristics, to obtain maximum selectivity. Since the parameters of the protective relay 10 are adjustable to both the characteristic admittance of the transmission line and the modal current vectors of the transmission system, less low pass filtering is needed than in prior art protective relays and therefore greater tripping speed is attained.

What is claimed is:

1. A protective relay for determining the location of a fault on the conductors of a three-phase ac electrical transmission line, comprising:
   means for providing first, second, and third incident-wave signals representative of the current produced on each conductor by a fault-launched incident traveling wave arriving at the relaying point from a first direction;
   means for providing first, second, and third forward-wave signals representative of the current produced on each conductor by a fault-launched forward traveling wave arriving at the relaying point from a second direction;
   comparator means for comparing said first, second, and third incident-wave signals with, respectively, said first, second, and third forward-wave signals to provide an indication of the direction to the fault and to provide an enable signal when the fault is in said first direction;
   first filter means for filtering said first, second, and third incident-wave signals to provide a modal signal representing the total current produced on the transmission line by a first propagational mode of said first incident traveling wave; and
   discriminator means for processing said first, second, and third incident-wave signals, said modal signal, and said enable signal to provide an indication of the location of the fault.

2. The protective relay of claim 1 including:
   means for producing first, second, and third filtered voltage signals representing the voltage due to the first incident and the first forward traveling waves on each conductor;
   admittance matrix means for processing said first, second, and third filtered voltage signals to produce first, second, and third voltage-derived current signals;
   means for producing first, second, and third filtered-current signals representing the current due to the first incident and the first forward traveling waves on each conductor; and
   arithmetic means for processing said first, second, and third voltage-derived current signals and said first, second, and third filtered-current signals to produce the first, second, and third incident-wave signals and the first, second, and third forward-wave signals.

3. The protective relay of claim 2 wherein the means for producing the first, second, and third filtered voltage signals includes:
   means measuring the total voltage on each conductor to produce first, second, and third measured-voltage signals;
   second filter means removing the steady-state ac electrical signal from said first, second, and third measured-voltage signals to produce the first, second, and third filtered-voltage signals.

4. The protective relay of claim 2 wherein the admittance matrix includes:
   a plurality of filter means representing the characteristic admittance of the transmission line, wherein said plurality of filter means is responsive to the first, second, and third filtered-voltage signals;

a plurality of summing means responsive to said plurality of filter means for producing the first, second, and third voltage-derived current signals.

5. The protective relay of claim 4 wherein each one of the plurality of filter means has a predetermined transfer function including an amplitude and a phase response.

6. The protective relay of claim 4 wherein:
first, second, and third filter means of the plurality of filter means are each responsive to the first filtered-voltage signal;
fourth, fifth, and sixth filter means of the plurality of filter means are each responsive to the second filtered-voltage signal;
seventh, eighth, and ninth filter means of the plurality of filter means are each responsive to the third filtered-voltage signal;
first summing means of the plurality of summing means is responsive to said first, fourth, and seventh filter means for producing the first voltage-derived current signal;
second summing means of the plurality of summing means is responsive to said second, fifth, and eighth filter means for producing the second voltage-derived current signal; and
third summing means of the plurality of summing means is responsive to said third, sixth, and ninth filter means for producing the third voltage-derived current signal.

7. The protective relay of claim 2 wherein the means for producing the first, second, and third filtered-current signals includes:
means measuring the total current on each conductor and producing first, second, and third measured-current signals;
third filter means removing the steady-state ac electrical signal from said first, second, and third measured-current signals to produce the first, second, and third filtered-current signals.

8. The protective relay of claim 2 wherein the arithmetic means includes summing means for adding the first, second, and third voltage-derived current signals to, respectively, the first, second, and third filtered-current signals to produce the first, second, and third forward-wave signals.

9. The protective relay of claim 8 wherein the arithmetic means includes subtractor means for subtracting the first, second, and third voltage-derived current signals from, respectively, the first, second, and third filtered-current signals to produce the first, second, and third incident-wave signals.

10. The protective relay of claim 1 wherein the comparator means includes:
means for generating a trajectory using the first incident-wave signal and the first forward-wave signal as X and Y coordinates, respectively;
means providing mutually exclusive threshold boundaries in the X-Y plane wherein said threshold boundaries have a predetermined slope and axis intercept in each quadrant of the X-Y plane;
threshold monitoring means for detecting the crossing of a threshold boundary by said trajectory and for producing a first trip signal if the crossing indicates the fault is in the first direction and for producing a first block signal if the crossing indicates the fault is in the second direction.

11. The protective relay of claim 10 wherein the threshold boundaries exclude an area near the origin of the X-Y plane such that traveling wave activity on the transmission line during non-fault conditions does not cause the threshold monitoring means to produce the first trip signal or the first block signal.

12. The protective relay of claim 10 wherein the comparator means includes:
means for generating a trajectory using the second incident-wave signal and the second forward-wave signal as X and Y coordinates, respectively;
means providing mutually exclusive threshold boundaries in the X-Y plane wherein said threshold boundaries have a predetermined slope and axis intercept in each quadrant of the X-P plane;
threshold monitoring means for detecting the crossing of a threshold boundary by said trajectory and for producing a second trip signal if the crossing indicates the fault is in the first direction and for producing a second block signal if the crossing indicates the fault is in the second direction.

13. The protective relay of claim 12 wherein the threshold boundaries exclude an area near the origin of the X-Y plane such that travelling wave activity on the transmission line during non-fault conditions does not cause the threshold monitoring means to produce the second trip signal or the second block signal.

14. The protective relay of claim 12 wherein the comparator means includes:
means for generating a trajectory using the third incident-wave signal and the third forward-wave signal as X and Y coordinates, respectively;
means providing mutually exclusive threshold boundaries in the X-Y plane wherein said threshold boundaries have a predetermined slope and axis intercept in each quadrant of the X-Y plane;
threshold monitoring means for detecting the crossing of said threshold boundaries by said trajectory and for producing a third trip signal if the crossing indicates the fault is in the first direction and for producing a third block signal if the crossing indicates the fault is in the second direction.

15. The protective relay of claim 14 wherein the threshold boundaries exclude an area near the origin of the X-Y plane such that traveling wave activity on the transmission line during non-fault conditions does not cause the threshold monitoring means to produce the third trip signal or the third block signal.

16. The protective relay of claim 14 including first OR gate means responsive to the first, second, and third trip signals for producing an intermediate trip signal.

17. The protective relay of claim 16 including second OR gate means responsive to the first, second, and third block signals for producing an intermediate block signal.

18. The protective relay of claim 17 including logic means for logically relating the intermediate trip signal and the intermediate block signal to produce a primary trip signal and a primary block signal wherein said primary trip signal and said primary block signal are mutually exclusive, and wherein said primary trip signal indicates that the fault is in the first direction and said primary block signal indicates that the fault is in the second direction.

19. The protective relay of claim 18 wherein the logic means includes:
first AND gate means responsive to the intermediate block signal for producing the primary block signal;

first NOT gate means responsive to the primary block signal for producing a first inverted signal;

second AND gate means responsive to said first inverted signal and the intermediate trip signal for producing the primary trip signal;

second NOT gate means responsive to the primary trip signal for producing a second inverted signal;

and wherein said first AND gate means is responsive to said second inverted signal.

20. The protective relay of claim 1 wherein the discriminator means includes means for comparing the first, second, and third incident-wave signals and the modal signal to provide an indication of the location of the fault.

21. The protective relay of claim 1 wherein the discriminator means includes:

means for generating a trajectory using the first and second incident-wave signals as X and Y coordinates, respectively;

means providing mutually exclusive threshold boundaries in the X-Y plane wherein said threshold boundaries have a predetermined slope and axis intercept in each quadrant of the X-Y plane;

threshold monitoring means for detecting the crossing of said threshold boundaries by said trajectory and for producing a first conductor-one conditional trip signal if the crossing indicates the fault may be on a first conductor of the ac electrical transmission line and for producing a first conductor-two conditional trip signal if the crossing indicates the fault may be on a second conductor of the ac electrical transmission line.

22. The protective relay of claim 21 wherein the threshold boundaries include a first straight line having a negative one-half slope and an intercept at the origin of the X-Y plane, and a second straight line having a negative two slope and an intercept at the origin of the X-Y plane.

23. The protective relay of claim 22 wherein the first conductor-one conditional trip signal is produced when the trajectory crosses into an area of the X-Y plane bounded by the X axis and the first straight line.

24. The protective relay of claim 22 wherein the first conductor-two conditional trip signal is produced when the trajectory crosses into an area of the X-Y plane bounded by the Y axis and the second straight line.

25. The protective relay of claim 21 wherein the discriminator means includes:

means for generating a trajectory using the first incident-wave signal and the modal signal as X and Y coordinates, respectively;

means providing mutually exclusive threshold boundaries in the X-Y plane wherein said threshold boundaries have a predetermined slope and axis intercept in each quadrant of the X-Y plane;

threshold monitoring means for detecting the crossing of said threshold boundaries by said trajectory and for producing a second conductor-one conditional trip signal in response thereto.

26. The protective relay of claim 25 wherein the threshold boundaries include an area in the first quadrant of the X-Y plane bounded by a line having a one-third slope and an intercept at the origin of the X-Y plane, bounded by the Y axis, and bounded by a line having zero slope and a Y-axis intercept at a point determined such that traveling wave activity on the transmission line during non-fault conditions does not cause the threshold monitoring means to produce the second conductor-one conditional trip signal.

27. The protective relay of claim 26 wherein the threshold boundaries include an area in the third quadrant of the X-Y plane bounded by a line having a one-third slope and an intercept at the origin of the X-Y plane bounded by the Y axis, and bounded by a line having zero slope and a Y-axis intercept at a point determined such that traveling wave activity on the transmission line during non-fault conditions does not cause the threshold monitoring means to produce the second conductor-one conditional trip signal.

28. The protective relay of claim 25 wherein the discriminator means includes:

means for generating a trajectory using the second and third incident-wave signals as X and Y coordinates, respectively;

means providing mutually exclusive threshold boundaries in the X-Y plane wherein said threshold boundaries have a predetermined slope and axis intercept in each quadrant of the X-Y plane;

threshold monitoring means for detecting the crossing of said threshold boundaries by said trajectory and for producing a second conductor-two conditional trip signal if the crossing indicates the fault may be on the second conductor and for producing a first conductor-three conditional trip signal if the crossing indicates the fault may be on a third conductor of the ac electrical transmission line.

29. The protective relay of claim 28 wherein the threshold boundaries include a first straight line having a negative one-half slope and an intercept at the origin of the X-Y plane, and a second straight line having a negative two slope and an intercept at the origin of the X-Y plane.

30. The protective relay of claim 29 wherein the second conductor-two conditional trip signal is produced when the trajectory crosses into an area of the X-Y plane bounded by the X axis and the first straight line.

31. The protective relay of claim 29 wherein the first conductor-three conditional trip signal is produced when the trajectory crosses into an area of the X-Y plane bounded by the Y axis and the second straight line.

32. The protective relay of claim 28 wherein the discriminator means includes:

means for generating a trajectory using the second incident-wave signal and the modal signal as X and Y coordinates, respectively;

means providing mutually exclusive threshold boundaries in the X-Y plane wherein said threshold boundaries have a predetermined slope and axis intercept in each quadrant of the X-Y plane;

threshold monitoring means for detecting the crossing of said threshold boundaries by said trajectory and for producing a third conductor-two conditional trip signal in response thereto.

33. The protective relay of claim 23 wherein the threshold boundaries include an area in the first quadrant of the X-Y plane bounded by a line having a one-third slope and an intercept at the origin of the X-Y plane, bounded by the Y axis, and bounded by a line having a zero slope and a Y-axis intercept at a point determined such that traveling wave activity on the transmission line during non-fault conditions will not cause the threshold monitoring means to produce the second conductor-one conditional trip signal.

34. The protective relay of claim 33 wherein the threshold boundaries include an area in the third quadrant of the X-Y plane bounded by a line having a one-third slope and an intercept at the origin of the X-Y plane, bounded by the Y axis, and bounded by a line having zero slope and a Y-axis intercept at a point determined such that traveling wave activity on the transmission line during non-fault conditions does not cause the threshold monitoring means to produce the second conductor-one conditional trip signal.

35. The protective relay of claim 32 wherein the discriminator means includes:
means for generating a trajectory using the third and first incident-wave signal as X and Y coordinates, respectively;
means providing mutually exclusive threshold boundaries in the X-Y plane wherein said threshold boundaries have a predetermined slope and axis intercept in each quadrant of the X-Y plane;
threshold monitoring means for detecting the crossing of said threshold boundaries by said trajectory and for producing a second conductor-three conditional trip signal if the crossing indicates the fault may be on the third conductor and for producing a third conductor-one conditional trip signal if the crossing indicates the fault may be on the first conductor.

36. The protective relay of claim 35 wherein the threshold boundaries include a first straight line having a negative one-half slope and an intercept at the origin of the X-Y plane, and a second straight line having a negative two slope and an intercept at the origin of the X-Y plane.

37. The protective relay of claim 36 wherein the second conductor-three conditional trip signal is produced when the trajectory crosses into an area of the X-Y plane bounded by the X axis and the first straight line.

38. The protective relay of claim 36 wherein the third conductor-one conditional trip signal is produced when the trajectory crosses into an area of the X-Y plane bounded by the Y axis and the second straight line.

39. The protective relay of claim 35 wherein the discriminator means includes:
means for generating a trajectory using the third incident-wave signal and the modal signal as X and Y coordinates, respectively;
means providing mutually exclusive threshold boundaries in the X-Y plane wherein said threshold boundaries have a predetermined slope and axis intercept in each quadrant of the X-Y plane;
threshold monitoring means for detecting the crossing of said threshold boundaries by said trajectory and for producing a third conductor-three conditional trip signal in response thereto.

40. The protective relay of claim 39 wherein the threshold boundaries include an area in the first quadrant of the X-Y plane bounded by a line having a one-third slope and an intercept at the origin of the X-Y plane, bounded by the Y axis, and bounded by a line having zero slope and a Y-axis, and bounded by a line having zero slope and a Y-axis intercept at a point determined such that traveling wave activity on the transmission line during non-fault conditions does not cause the threshold monitoring means to produce the second conductor-one conditional trip signal.

41. The protective relay of claim 40 wherein the threshold boundaries include an area in the third quadrant of the X-Y plane bounded by a line having a one-third slope and an intercept at the origin of the X-Y plane, bounded by the Y axis, and bounded by a line having zero slope and a Y-axis intercept at a point determined such that traveling wave activity on the transmission line during non-fault conditions does not cause the threshold monitoring means to produce the second conductor-one conditional trip signal.

42. The protective relay of claim 39 wherein the discriminator means includes logic means for logically relating the first, second, and third conductor-one conditional trip signals, the first, second, and third conductor-two conditional trip signals, the first, second, and third conductor-three conditional trip signals, and the enable signal to provide a conductor-one primary trip signal if the fault is located on the first conductor in the first direction, a conductor-two primary trip signal if the fault is located on the second conductor in the first direction, a conductor-three primary trip signal if the fault is located on the third conductor in the first direction, and a three-phase trip signal if the protective relay determines the fault is in the first direction but cannot determine the conductor on which the fault is located.

43. The protective relay of claim 42 wherein the logic means includes third AND gate means responsive to the first, second, and third conductor-one conditional trip signals and the enable signal for producing the conductor-one primary trip signal.

44. The protective relay of claim 43 wherein the logic means includes fourth AND gate means responsive to the first, second, and third conductor-two conditional trip signals and the enable signal for producing the conductor-two primary trip signal.

45. The protective relay of claim 44 wherein the logic means includes fifth AND gate means responsive to the first, second, and fifth conductor-three conditional trip signals and the enable signal for producing the conductor-three primary trip signal.

46. The protective relay of claim 45 wherein the logic means includes:
third OR gate means responsive to the conductor-one, conductor-two, and conductor-three primary trip signals for producing an output signal;
third NOT gate means responsive to said output signal for producing an inverted signal;
delay means responsive to the enable signal for producing a delayed signal; and
sixth AND gate means responsive to said inverted signal and said delayed signal for producing the three-phase trip signal.

47. A protective relay for determining the location of a fault on the conductors of a three-phase AC electrical transmission line, comprising:
means for producing first, second and third voltage signals representing the voltage on each conductor due to a fault-launched incident traveling wave arriving at the relaying point from a first direction and due to a fault-launched forward traveling wave arriving at the relaying point from a second direction.
first, second, and third filter means responsive to said first voltage signal, wherein said first, second, and third filter means represent the characteristic admittance of the transmission line;
fourth, fifth, and sixth filter means responsive to said second voltage signal, wherein said fourth, fifth, and sixth filter means represent the characteristic admittance of the transmission line;

seventh, eighth, and ninth filter means responsive to said third voltage signal, wherein said seventh, eighth, and ninth filter means represent the characteristic admittance of the transmission line;

first summing means responsive to said first, fourth, and seventh filter means for producing a first voltage-derived current signal;

second summing means responsive to said second, fifth, and eighth filter means for producing a second voltage-derived current signal;

third summing means responsive to said third, sixth, and ninth filter means for producing a third voltage-derived current signal;

means for producing first, second, and third current signals representing the current on each conductor due to said fault-launched incident traveling wave arriving at the relaying point from said first direction and due to said fault-launched forward traveling wave arriving at the relaying point from said second direction;

fourth summing means for adding said first, second, and third voltage-derived current signals to, respectively, said first, second, and third current signals to produce first, second, and third forward-wave signals;

subtractor means for subtracting said first, second, and third voltage-derived current signals from, respectively, said first, second, and third current signals to produce first, second, and third incident-wave signals;

tenth filter means for filtering said first, second, and third incident-wave signals to provide a modal signal representing the total current produced on the transmission line by a first mode of said first, second, and third incident-wave signals;

comparator means for comparing said first, second, and third incident-wave signals with, respectively, said first, second, and third forward wave signals to provide an indication of the direction to the fault and to provide an enable signal when the fault is in said first direction;

means for generating a first trajectory, in a first X-Y plane, using said first and second incident-wave signals as X and Y coordinates, respectively, means for generating a second trajectory, in a second X-Y plane, using said second and third incident-wave signals as X and Y coordinates, respectively, means for generating a third trajectory, in a third X-Y plane, using said third and first incident-wave signals as X and Y coordinates, respectively, means providing threshold boundaries in each of said first, second, and third X-Y planes, including a first straight line having a negative one-half slope and an intercept at the origin of said first, second, and third X-Y planes and a second straight line having a negative two slope and an intercept at the origin of said first, second, and third X-Y planes, first threshold monitoring means for detecting the crossing of a threshold boundary by said first, second, and third trajectory for producing a first conductor-one conditional trip signal when said first trajectory crosses into an area of said first X-Y plane bounded by said X axis and said first straight line, for producing a first conductor-two conditional trip signal when said first trajectory crosses into an area of said first X-Y plane bounded by said Y axis and said second straight line, for producing a second conductor-two conditional trip signal when said second trajectory crosses into an area of said second X-Y plane bounded by said X axis and said first straight line, for producing a first conductor-three conditional trip signal when said second trajectory crosses into an area of said second X-Y plane bounded by said Y axis and said second straight line, for producing a second conductor-three conditional trip signal when said third trajectory crosses into an area of said third X-Y plane bounded by said X axis and said first straight line, and for producing a second conductor-one conditional trip signal when said third trajectory crosses into an area of said third X-Y plane bounded by said Y axis and said second straight line;

means for generating a fourth trajectory in a fourth X-Y plane using said first incident-wave signal and said modal signal as X and Y coordinates, respectively;

means for generating a fifth trajectory in a fifth X-Y plane using said second incident-wave signal and said modal signal as X and Y coordinates, respectively;

means for generating a sixth trajectory in a sixth X-Y plane using said third incident-wave signal and said modal signal as X and Y coordinates, respectively;

means providing threshold boundaries in each of said fourth, fifth, and sixth X-Y planes, including areas in the first and third quadrants wherein each area is bounded by a line having a one-third slope and an intercept at the origin of said fourth, fifth, and sixth X-Y planes, bounded by the Y axis, and bounded by a line having zero slope and a Y-axis intercept at a point determined such that traveling wave activity on the transmission line during non-fault conditions does not cause said fourth, fifth, and sixth trajectories to cross a threshold boundary;

second threshold monitoring means for detecting the crossing of a threshold boundary by said fourth, fifth, and sixth trajectory for producing a third conductor-one conditional trip signal when said fourth trajectory crosses a threshold boundary of said fourth X-Y plane, for producing a third conductor-two conditional trip signal when said fifth trajectory crosses a threshold boundary of said fifth X-Y plane, and for producing a third conductor-three conditional trip signal when said sixth trajectory crosses a threshold boundary of said sixth X-Y plane;

first AND gate means responsive to said first, second, and third conductor-one conditional trip signals and said enable signal for producing a conductor-one primary trip signal indicating that the fault is in said first direction on the first conductor;

second AND gate means responsive to said first second, and third conductor-two conditional trip signals and said enable signal or producing a conductor-two primary trip signal indicating that the fault is in said first direction on the second conductor;

third AND gate means responsive to said first, second, and third conductor-three conditional trip signals and said primary trip signal for producing a conductor-three primary trip signal indicating that the fault is in said first direction on the third conductor;

first OR gate means responsive to said conductor-one, conductor-two, and conductor-three primary trip signals for producing an output signal;

NOT gate means responsive to said output signal for producing an inverted output signal;

delay means responsive to said primary trip signal for producing a delayed signal;

fourth AND gate means responsive to said inverted output signal and said delayed signal for producing a three-phase trip signal indicating that the fault is in said first direction but said protective relay is unable to determine the conductor on which the fault is located.

48. A method of determining the location of a fault on the conductors of a three-phase ac electrical transmission line, comprising the steps of:

providing first, second, and third incident-wave signals representative of the current produced on each conductor by a fault-launched incident traveling wave arriving at the relaying point from a first direction;

providing first, second, and third forward-wave signals representative of the current produced on each conductor by a fault-launched forward traveling wave arriving at the relaying point from a second direction;

comparing said first, second, and third incident-wave signals with, respectively, said first, second, and third forward-wave signals to provide an indication of the direction to the fault and to provide an enable signal when the fault is in said first direction;

filtering said first, second, and third incident-wave signals to provide a modal signal representing the total current produced on the transmission line by a first propagational mode of said first incident traveling wave; and processing said first, second, and third incident-wave signals, said modal signal, and said enable signal to provide an indication of the location of the fault.

* * * * *